United States Patent [19]

Wakugawa

[11] Patent Number: 5,058,993
[45] Date of Patent: Oct. 22, 1991

[54] LIGHTWEIGHT OPTICAL BENCH AND METHOD OF FABRICATING SAME

[75] Inventor: Jason M. Wakugawa, Rolling Hills Estates, Calif.

[73] Assignee: Hughes Aircraft Company, Los Angeles, Calif.

[21] Appl. No.: 590,708

[22] Filed: Oct. 1, 1990

[51] Int. Cl.$^5$ .......................... G02B 5/00; G02B 7/18
[52] U.S. Cl. .................................. 359/896; 359/819; 359/848; 359/871
[58] Field of Search ............... 350/252, 245, 321, 320, 350/609, 631, 612, 618, 619, 620, 610, 247; 248/200.1, 205.1, 219.1, 218.4

[56] References Cited

U.S. PATENT DOCUMENTS

| | | | |
|---|---|---|---|
| 4,796,974 | 1/1989 | Brakenhoff | 350/247 |
| 4,856,887 | 8/1989 | Wakugawa et al. | 350/641 |
| 4,927,257 | 5/1990 | Enterline et al. | 350/631 |

*Primary Examiner*—Loha Ben
*Attorney, Agent, or Firm*—William J. Streeter; W. K. Denson-Low

[57] ABSTRACT

An optical bench (10) includes a pair of end plates (12, 14) rigidly interconnected by a plurality of tubular connecting members (16). The connecting members (16) are formed by chemically vapor-depositing silicon carbide on a mandrel (17) and result in high-precision surface finishes which do not require subsequent machining or surface treatment. The end plates (12, 14) are formed by casting a reaction-bonded silicon carbide into near-final shape. Socket holes (18) are formed in the end plates (12, 14) to receive the connecting members (16) which are secured to the end plates (12, 14) by brazing.

36 Claims, 4 Drawing Sheets

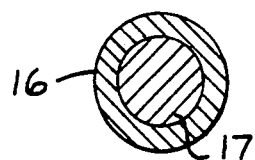
FIG.3
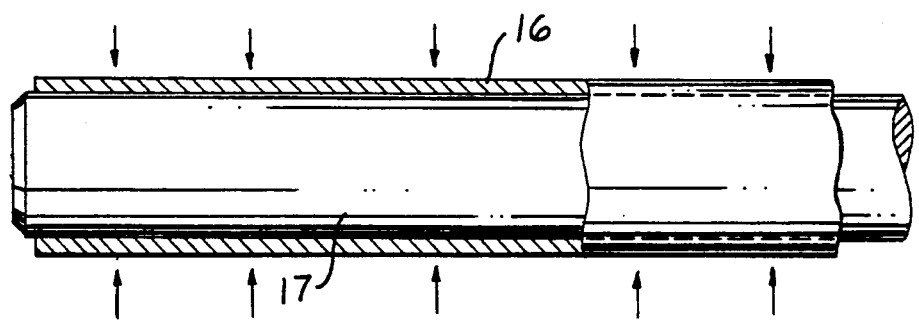
FIG.4
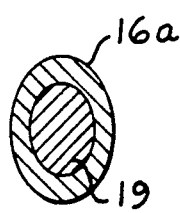
FIG.5
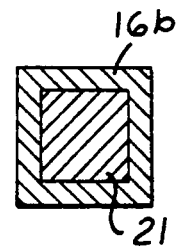
FIG.6
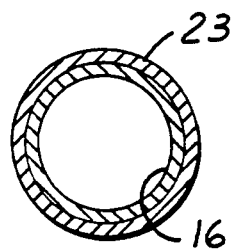
FIG.7
FIG.8
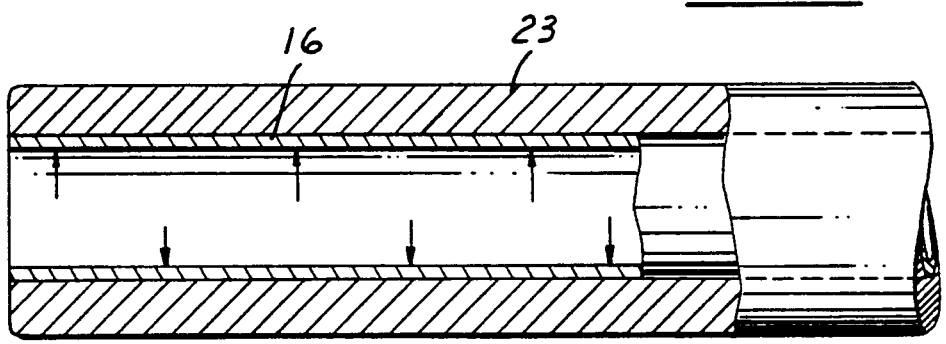

LIGHTWEIGHT OPTICAL BENCH AND METHOD OF FABRICATING SAME

TECHNICAL FIELD

The present invention generally relates to structural mounts, sometimes referred to as "optical benches" for mounting relatively large optical elements in fixed relationship to each other, and deals more particularly with a unique construction for an optical bench and a method of fabricating such bench.

BACKGROUND OF THE INVENTION

Optical mounting systems, sometimes referred to as an "optical bench," are employed for mounting various optical elements and focal planes in fixed relationship with each other for various applications including remote sensing systems used in satellites. These types of applications require that the optical bench be as lightweight as possible and dictate high thermo-mechanical performance criteria. Such applications also require that the optical bench operate satisfactorily at cyrogenic temperatures. Infrared sensor systems are often subjected to operating temperatures in the regime of 150° K. to 20° K.

Methods for actively aligning the optical elements mounted on these optical benches at the temperatures mentioned above are not currently available. Consequently, optical alignment is achieved by iteratively adjusting the position of the optical elements at room temperature and then measuring the alignment at the operating temperature. The thermal contraction of the materials of which the optical bench is formed, especially the material used for the structure spanning the distance between optical components, must be compensated for during room temperature adjustment.

Beryllium has enjoyed widespread use in the past as the material from which optical benches are formed, especially when cryogenic operating temperatures are required. The design configuration of prior art optical benches commonly consists of an assembly of intricately machined parts which are fastened together with screws or pins. Extruded shapes are commercially available but have not been used in part because of potential problems associated with the anisotropy of beryllium material in this form (fabrication processes such as extrusion and hot pressing tend to cause alignment of the hexagonal-structured beryllium grains, which individually have anisotropic thermo-mechanical properties). Although beryllium cannot be cast to near-net shape, it can be hot-isostatically pressed to near-net shape. Hot isostatic pressing of beryllium continues to be under development and has not yet been perfected for use in optical benches.

Fabrication of larger parts becomes increasingly difficult as larger forces and processing equipment are required. The machining and stress-relieving of beryllium block, wrought or extruded stock requires chemical etching as the final step in order to remove the surface damage caused by machining. Machined surfaces which are not subsequently etched to remove surface damage sometimes induce dimensional instability and cracking. Additional surface treatment, such as passivation or anodizing, is required to retard corrosion. Also, due to the extreme toxicity of beryllium dusts or oxides, special handling procedures are required. Further, machining of intricate beryllium parts is a very time-consuming process, and the availability of beryllium metal is quite limited. The cost of beryllium metal is sufficiently high to justify collection and recycling of chips produced during machining.

From the foregoing, it is clear that it would be very desirable to fabricate an optical bench using materials which not only obviate the problems associated with manufacturing discussed above, but also increase the performance of the bench. The present invention is directed toward satisfying this need in the art.

SUMMARY OF THE INVENTION

In accordance with the present invention, a lightweight optical bench for holding one or more optical elements includes a pair of spaced apart end pieces or plates upon which optical elements may be mounted and a plurality of elongate connecting members, typically tubes, rigidly connecting the end plates in fixed relationship to each other. The end plates are preferably formed by casting a reaction-bonded silicon carbide to near-final shape. The connecting members are preferably formed by chemically vapor-depositing silicon carbide either on the outside surface of a mandrel or on the inside surface of a tubular mandrel. The connecting members may be of various cross-sectional shapes, including circular, oval and rectangular. The opposite ends of the tubular connecting members are received within sockets in the end plates and are fixedly secured thereto by brazing.

According to another aspect of the invention, a method is provided for fabricating a lightweight optical mount which comprises the steps of forming the end pieces of the mount from silicon carbide, forming the rigid interconnecting members from silicon carbide, and then connecting the end pieces with the rigid interconnecting members, preferably by brazing. The end pieces are preferably formed, as mentioned above, by casting a reaction-bonded silicon carbide, and the interconnecting members are preferably formed by chemically vapor-depositing silicon carbide on a mandrel.

The optical bench and method of fabricating same according to the present invention possesses numerous advantages over prior art beryllium structural designs, including easier and less costly fabrication and improved thermo-mechanical performance. Chemical vapor depositing of the silicon carbide to form the connecting members permits precise control of the outer diameter of the connecting tubes and precise surface finish without the need for subsequent grinding. Precise control of the outer diameter and surface finish provides for a tighter tolerance between the ends of the connecting tubes and the sockets within the end plates. Casting of the silicon carbide end plates to near-net shape eliminates the need for grinding them to final size with the exception of the grinding of the sockets. The post-ground surfaces do not require etching or heat treatment to remove surface damage. Neither the connecting tubes nor the end plates require surface treatment for corrosion protection.

These and other advantages and objects of the invention will become clear or will be made apparent during the following detailed description of the preferred embodiments of the invention.

BRIEF DESCRIPTION OF THE DRAWINGS

FIG. 3 is a cross-sectional view depicting one embodiment of the connecting members;

FIG. 4 is a longitudinal view of the connecting member shown in FIG. 3, parts being broken away in section during the deposition process;

FIGS. 5 and 6 are cross-sectional views respectively of alternate forms of the connecting members;

FIG. 7 is a cross-sectional view depicting a step in manufacturing another alternate form of the connecting members;

FIG. 8 is a longitudinal view, parts being broken away in section, showing the process of depositing silicon carbide on the interior of a tube mandrel;

FIG. 12 is a side elevational view of yet another embodiment of the optical bench of the present invention.

DETAILED DESCRIPTION OF THE PREFERRED EMBODIMENTS

Figure 1:
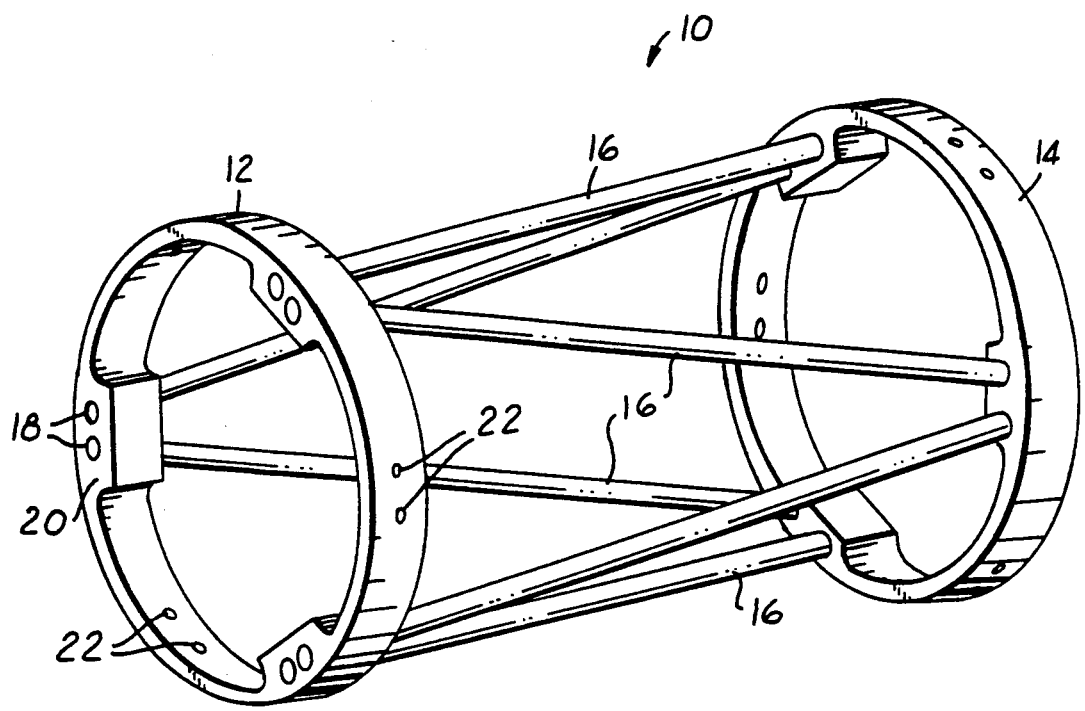
FIG. 1 is a perspective view of one embodiment of an optical bench according to the present invention.

Referring first to FIG. 1, the present invention broadly relates to an optical mount generally indicated by the numeral 10 which is often referred to in the art as an optical bench and forms a mechanical structure for mounting various types of optical elements (not shown) in fixed relationship to each other. The optical bench 10 broadly includes a pair of spaced apart end pieces or plates 12, 14 which are held in fixed relationship to each other by a plurality of rigid, elongate connecting members 16 In the embodiment illustrated in FIG. 1, the end plates 12, 14 are substantially ring-shaped having portions 20 of increased radial thickness in which there is formed longitudinally extending sockets 18. The sockets 18 receive therein the opposite ends of the connecting members 16. Holes 22 are formed around the Periphery of the end plates 12, 14 to provide a means of mounting optical elements such as a mirror (not shown) on the associated end plate.

As mentioned above, the interconnecting members 16 are preferably tubular and may be of various cross-sectional shapes, including circular, oval or rectangular, for example. The cross-sectional configuration and the number of connecting members 16 which are selected will vary depending upon the application to achieve optimum performance. A diamond shaped cross-section might be employed, for example, in certain applications where the light scattering properties of the member 16 is an important factor.

Figure 2:
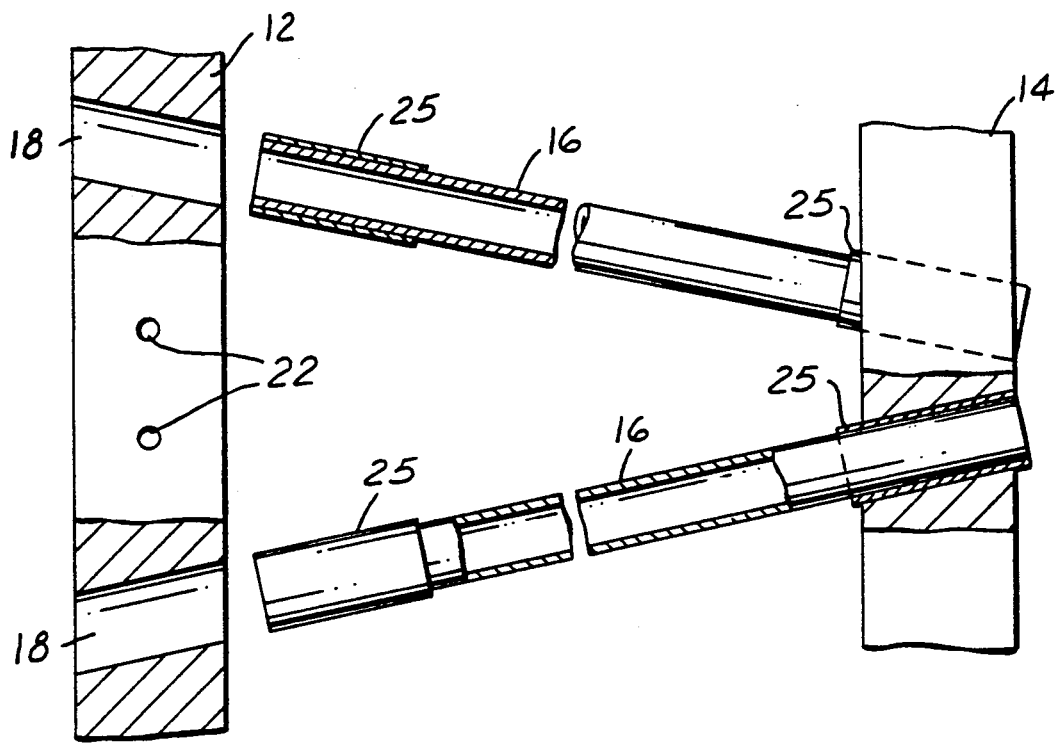
FIG. 2 is an enlarged, fragmentary, longitudinal view of a portion of the bench shown in FIG. 1, parts being broken away and exploded for clarity.

The tubular connecting members 16 may be formed by chemically vapor-depositing silicon carbide on a central mandrel 17, as shown in FIGS. 3 and 4. FIGS. 5 and 6 depict CVD-deposited connecting members 16a, 16b respectively formed over mandrels 19 and 21 which respectively have an oval and rectangular cross-section. Alternatively, as shown in FIGS. 7 and 8, the connecting members 16 may be formed by chemically vapor-depositing silicon carbide on the inside surface (inner diameter) of a cylindrical tube mandrel 23. This latter process allows precise control over the tube outer diameter and surface finish without the need for subsequent surface finishing or grinding. In the case of forming the tube 16 over the rod-type mandrels 17, 19 and 21, grinding of the ends of the connecting members 16 is required to achieve the required outside diameter and surface finish. The precise control of outer diameter is necessary to assure that the ends of the connecting members 16 are closely received within the sockets 18, and precise control of surface finish is necessary to assure that a good bond is achieved during brazing. After the silicon carbide material is CVD-deposited onto the mandrel 17, 19, 21, the mandrel may be removed so that the entire connecting member 16 is formed solely of silicon carbide. Alternatively, as shown in FIG. 2, the silicon carbide may be CVD-deposited in an outer layer 25 onto the ends of a mandrel of a suitable lightweight material such as graphite so that the connecting members 16 are formed of a composite construction with the graphite providing a portion of the necessary structural support and stiffness, and the deposited silicon carbide layer 25 providing a structural skin defining the finished outer dimensions of the ends of the graphite members which are received within the sockets 18.

The end plates 12, 14 are fabricated to near-net shape by casting reaction-bonded silicon carbide into the desired shape. Reaction-bonded silicon carbide is sometimes known as siliconized silicon carbide or reaction-sintered silicon carbide and is made fully dense by filling any residual porosity with silicon. Other types of silicon carbide may be employed, such as hot-pressed or re-crystallized silicon carbide, but preferably have porosities of 16% or less. Silicon carbide having porosities greater than 16% has unproven thermo-mechanical properties and is therefore presently believed to be unsuitable for use in optical benches. Silicon carbides having porosities less than 16% are readily available, for example, from Ceradyne Specialty Products, Gardner, Mass., and United Technologies Optical Systems, West Palm Beach, Fla. Suitable silicon carbide used in fabricating the connecting members 16 is available from Thermo Electron, Waltham, Mass., Amercom, Inc., Chatsworth, Calif., and CVD, Inc., Woburn, Mass. In any event, casting of the end plates 12, 14 to near-final shape eliminates the need for subsequent grinding thereof, except with respect to the sockets 18 and any other reference surfaces thereon which provide a mounting surface for mounting optical elements. Otherwise, neither the end plates 12, 14, nor the connecting members 16 require etching or heat treatment to remove surface damage, nor are surface treatments required to provide corrosion protection.

The structural integrity of the optical bench 10 depends largely upon the rigid attachment between the connecting members 16 and the end plates 12, 14. Brazing is the preferred form of connection because of its strength, stiffness and reliability. Adhesive bonding is unsatisfactory because the properties of currently available adhesives depend heavily on temperature and moisture absorption; at cryogenic temperatures, these adhesives lose their ability to reliably carry loads. Mechanical fastening using screws or pins, as employed in the prior art, is undesirable because they induce stress concentrations which can cause premature structural failure. Welding is inappropriate because it is not applicable to ceramic materials such as silicon carbide. Suitable braze materials are Lucanex 616, available from Lucas-Milhaupt, and Cusil ABA, available from GTE Westgo, although other braze materials may be used. Lucanex 616 is a brazing paste and is brushed onto the mating surfaces (ends of connecting members 16 and sockets 18); because of its paste-like consistency, this brazing material flows into the valleys of rough surfaces Cusil ABA is a foil which may be wrapped around the ends of the connecting members 16 prior to brazing.

The connecting members 16 and any inserts (not shown) which may be introduced into the sockets 18 can be brazed to the end plates 12, 14 with the same braze material in a single furnace operation. Alternatively, they may be brazed together in separate furnace operations, using a technique known in the art as step brazing. By way of example to illustrate the close-fitting relationship between the ends of the connecting members 16 and the sockets 18, the outer diameters of the connecting members 16 may be 0.004 to 0.007 inch smaller than the inside diameter of the sockets 18 prior to brazing. The close fit between the connecting members 16 and the sockets 18 minimizes the tensile and peeling stresses across the braze joints and also maximizes the stiffness of the joints.

Figure 9:
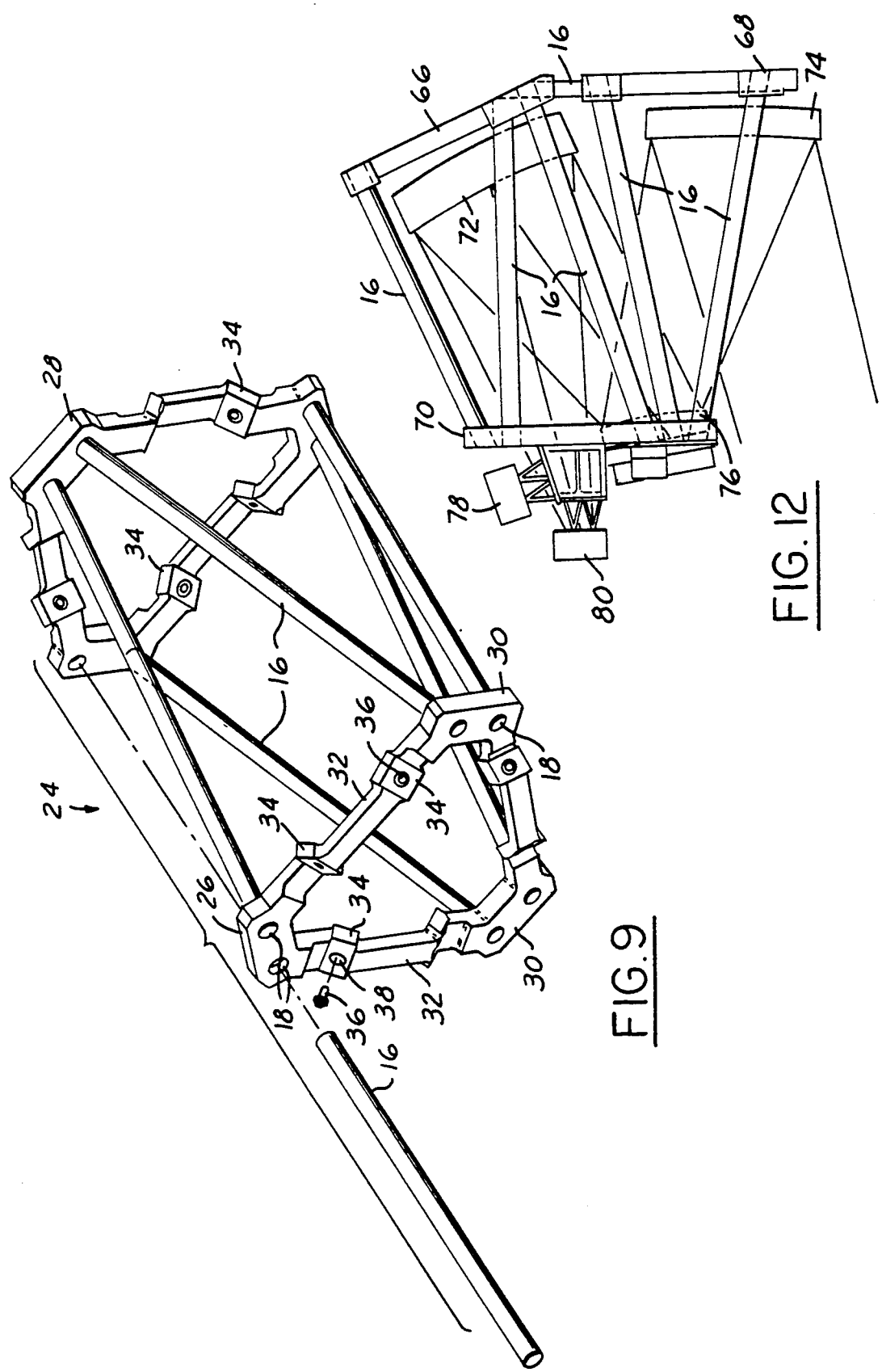
FIG. 9 is a perspective view of another embodiment of the optical bench of the present invention, several components being shown in an exploded fashion for clarity.

Reference is now made to FIG. 9 which depicts an alternate embodiment 24 of the optical bench of the present invention. The optical bench 24 includes a pair of end plates 26, 28 which are generally of triangular configuration and are interconnected by three pairs of connecting members 16. The connecting members 16 and end plates 26, 28 are formed of silicon carbide in the manner discussed previously with respect to FIGS. 1-5. As in the case of the embodiment of FIG. 1, the connecting members 16 are arranged in a truss configuration to provide the bench 24 with maximum rigidity. Each of the end plates 26, 28 includes three connecting legs 32 which are joined at their ends by a boss 30 having a pair of sockets 18 formed therein. The ends of the connecting members 16 are secured within the sockets 18 by brazing in accordance with the process discussed in connection with FIG. 1.

Each of the legs 32 includes a pair of blocks 34 having a ground surface finish which acts as a reference surface for mounting an optical element thereon. The blocks 34 include apertures 38 therein for receiving inserts 36. Each of the inserts 36 is secured to the block as by brazing in accordance with the brazing process previously described and comprises a thin wall tube having screw threads on the inside surface thereof which are adapted to receive the mating threads of a mounting element for mounting an optical element on the associated end plate 26, 28. One end of the insert may have a flange or similar feature to provide self-fixturing or seating during the brazing process. The use of the inserts 36 is necessary since it is not possible to tap reliable screw threads into reaction-bonded silicon carbide. The inserts 36 may be, for example, ASTM F 15 Kovar, which possesses a good thermal expansion match with silicon carbide up to 1,000° C. However, other low-expansion metals such as MIL-S-16598 Invar may also be used for the inserts 36.

Figure 10:
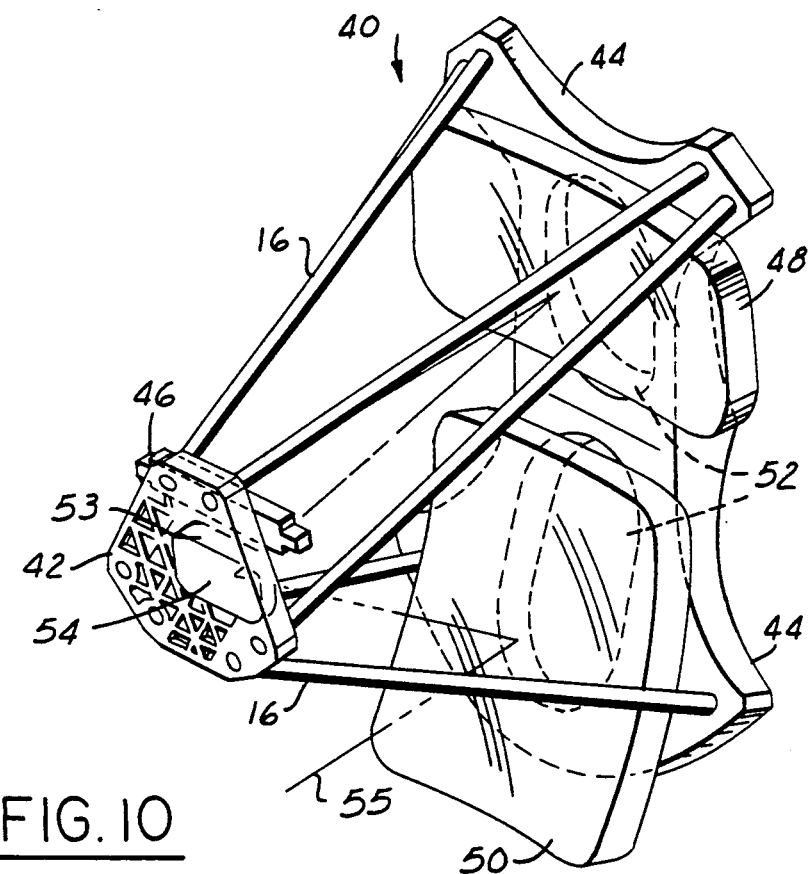
FIG. 10 is a perspective view of another embodiment of the optical bench of the present invention, having several optical elements mounted thereon.

Reference is now made to FIG. 10 wherein another alternate embodiment 40 of the optical bench of the present invention is depicted. A pair of end plates 42, 44 are connected together by a plurality of connecting members 16 in accordance with the process and the materials used in the embodiments of FIGS. 1 and 9, previously described. The end plates 42, 44 include openings 52, 54 therein to decrease their weight and may possess an egg crate-type back face to further reduce weight while maintaining structural rigidity. Tertiary and primary mirrors 48, 50 are mounted on the inner face of the end plate 44, while a secondary mirror 53 and focal plane array 46 are mounted on the inner face of the end plate 42. The central optical path for this optical system is designated by the numeral 55. The mirrors 48, 50 and 53 are formed by chemically vapor-depositing silicon carbide over a foam core in accordance with U.S. Pat. No. 4,856,887 owned by the assignee of the present application, the entire disclosure of which is incorporated herein by reference. By fabricating the mirrors 48, 50 and 53 out of the same materials of which the end plates 42, 44 are formed, distortions in the mirrors caused by differential thermal expansion between the mirrors and the bench 40 is minimized. Adjustable, bolt-on mirror mounts (not shown) can be used to mount the silicon carbide mirrors 48, 50, 53 on the bench 40, resulting in a substantial savings in terms of both weight and complexity.

Figure 11:
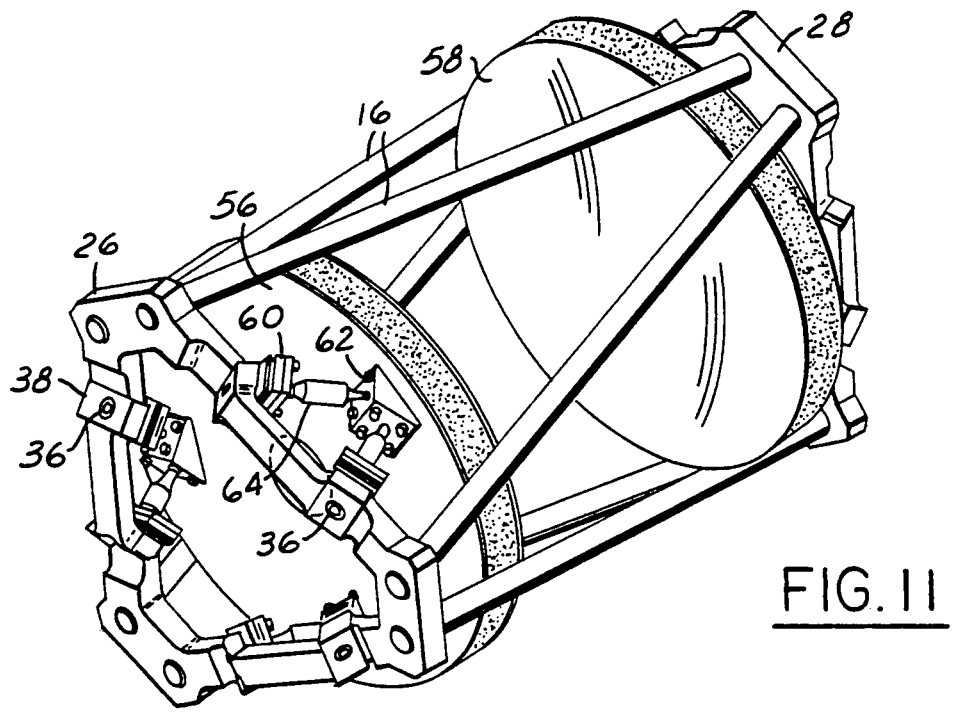
FIG. 11 is a perspective view of the optical bench shown in FIG. 9, but having optical elements mounted thereon.

FIG. 11 depicts another embodiment of the optical bench of the present invention having end plates 26, 28 and connecting members 16 arranged in a manner similar to that previously discussed with respect to FIG. 6. A pair of reflecting mirrors 56, 58 forming a telescope are respectively mounted on the end plates 26, 28 by means of a mounting assembly comprising a mounting base 60 which is threadably received within the inserts 36, a pivotal hexapod 60 and a mirror mount 62 which is secured to the rear face of the associated mirror 56, 58.

FIG. 12 depicts a further embodiment of the optical bench of the present invention and illustrates a more complex arrangement which includes three end plates 66, 68 and 70 secured in fixed relationship with each other by interconnecting members Tertiary and primary mirrors 72, 74 are respectively mounted on end plates 66 and 68, while a secondary mirror 76 as well as focal plane arrays 78, 80 are mounted on the end plate 70. The construction of the end plates 66, 68 and 70 as well as the connecting members 16 is identical with that previously described with reference to the prior embodiments.

From the foregoing, it can be appreciated that the optical bench and method of making same in accordance with the present invention not only provides for the reliable accomplishment of the objects of the invention but do so in a particularly simple and cost-effective manner. It is recognized, of course, that those skilled in the art may make various modifications or additions to the preferred embodiments chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A lightweight optical bench for holding one or more optical elements, comprising:
   a pair of spaced apart end pieces upon which said optical elements may be mounted; and
   a plurality of elongate connecting members rigidly connecting said end pieces in fixed relationship to each other, at least certain of said end pieces or said connecting members being formed of silicon carbide.

2. The lightweight optical bench of claim 1, wherein each of said end pieces and each of said connecting members include at least portions thereof formed of silicon carbide.

3. The lightweight optical bench of claim 2, wherein said each of said end pieces includes a central opening therein and said connecting members are connected to the end pieces around the respective peripheries thereof.

4. The lightweight optical bench of claim 3, wherein said connecting members are arranged between said end pieces in a truss configuration.

5. The lightweight optical bench of claim 4, wherein said each of said end pieces is substantially triangular in shape.

6. The lightweight optical bench of claim 4, wherein said each of said end pieces is substantially circular in shape.

7. The lightweight optical bench of claim 2, wherein said connecting members are connected to said end pieces by brazed joints.

8. The lightweight optical bench of claim 7, wherein said each of said end pieces includes a plurality of sockets for respectively receiving the ends of said connecting members therein, the ends of said connecting members and said sockets defining said joints.

9. The lightweight optical bench of claim 2, including means for mounting said optical elements on said end pieces, said mounting means includes a plurality of threaded inserts in said end pieces and threaded mounting members threadably received within said inserts for mounting said optical elements on said end pieces.

10. The lightweight optical bench of claim 1, wherein each of said connecting members includes at least portions formed of chemically vapor deposited silicon carbide.

11. The lightweight optical bench of claim 10, wherein said each of said connecting members is tubular in shape.

12. The lightweight optical bench of claim 11, wherein said each of said connecting members possesses a circular cross-section.

13. The lightweight optical bench of claim 11, wherein said each of said connecting members possesses a substantially oval cross-section.

14. The lightweight optical bench of claim 11, wherein said each of said connecting members possesses a substantially rectangular cross-section.

15. The lightweight optical bench of claim 1, wherein each of said end pieces is formed of a reaction-bonded silicon carbide.

16. A lightweight optical mount for holding a plurality of optical elements in fixed relationship to each other, comprising:
a pair of spaced apart support plates formed of silicon carbide;
a plurality of elongate members rigidly interconnecting said support plates; and,
means for mounting said optical elements on said support plates.

17. The lightweight optical mount of claim 16, wherein said support plates are formed from a reaction-bonded silicon carbide.

18. The lightweight optical mount of claim 16, wherein said elongate members include at least portions formed of a chemically vapor-deposited silicon carbide.

19. The lightweight optical mount of claim 18, wherein each of said elongate members is tubular.

20. The lightweight optical mount of claim 19, wherein said elongate, tubular members are arranged in a truss configuration between said support plates.

21. The lightweight optical mount of claim 18, wherein said support plates include a plurality of sockets within which the ends of said elongate members are received, and the ends of said elongate members are brazed to said support plates at said sockets.

22. The lightweight optical mount of claim 16, wherein said elongate members are connected to said support plates around the respective peripheries of said support plates.

23. The lightweight optical mount of claim 22, wherein at least one of said support plates includes an open area in the central region thereof.

24. Optical apparatus, comprising:
at least two support plates formed of silicon carbide;
a plurality of rigid connecting members connecting said support plates in fixed relationship to each other, said connecting members being formed of silicon carbide; and
at least one optical element mounted on one of said support plates, said optical element including a silicon carbide mirror.

25. The optical apparatus of claim 24, wherein said support plates are formed of a cast, reaction-bonded silicon carbide material.

26. The optical apparatus of claim 25, wherein each of said connecting members is formed of a chemically vapor-deposited silicon carbide material.

27. A method of making a lightweight optical mount having at least two end pieces for holding optical elements, and a plurality of rigid members interconnecting the end pieces in fixed relationship to each other, comprising the steps of:
(A) forming said end pieces from silicon carbide;
(B) forming said rigid interconnecting members; and,
(C) connecting said end pieces with said rigid interconnecting members.

28. The method of claim 27, wherein step (A) is performed by casting a reaction-bonded silicon carbide into the shape of said end pieces.

29. The method of claim 27, wherein step (A) includes forming sockets in said end pieces.

30. The method of claim 29, wherein forming said sockets includes grinding openings in said end pieces.

31. The method of claim 27, wherein step (A) includes forming openings in said end pieces, forming a plurality of threaded inserts, and installing said inserts respectively in said openings.

32. The method of claim 27, wherein step (B) is performed by chemically vapor-depositing silicon carbide on a mandrel to form each of said members.

33. The method of claim 32, wherein said silicon carbide is chemically vapor-deposited on the inner diameter of a tube mandrel, and said tube mandrel is removed after said silicon carbide has been deposited.

34. The method of claim 32, wherein said silicon carbide is chemically vapor-deposited on the outer surface of a rod mandrel and said mandrel is thereafter removed from the deposited silicon carbide.

35. The method of claim 27, wherein step (C) is performed by brazing the ends of said members to said end pieces.

36. The method of claim 27, wherein step (B) is performed by depositing a layer of silicon carbide on the ends of a mandrel to form each of said members.

* * * * *